United States Patent
Biswas et al.

(10) Patent No.: US 9,172,557 B2
(45) Date of Patent: Oct. 27, 2015

(54) LOAD BALANCING OVERLAY NETWORK TRAFFIC USING A TEAMED SET OF NETWORK INTERFACE CARDS

(75) Inventors: Amitabha Biswas, San Francisco, CA (US); Jayakrishna Kidambi, San Jose, CA (US); Santosh Rajagopalan, San Jose, CA (US); Tang Gang, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/588,578

(22) Filed: Aug. 17, 2012

(65) Prior Publication Data

US 2014/0050091 A1    Feb. 20, 2014

(51) Int. Cl.
| | |
|---|---|
| H04L 12/46 | (2006.01) |
| H04L 29/06 | (2006.01) |
| H04L 29/08 | (2006.01) |
| H04L 12/715 | (2013.01) |
| H04L 12/743 | (2013.01) |
| H04L 29/12 | (2006.01) |
| G06F 9/455 | (2006.01) |
| H04L 12/803 | (2013.01) |
| H04L 12/741 | (2013.01) |

(52) U.S. Cl.
CPC ............ *H04L 12/4641* (2013.01); *G06F 9/455* (2013.01); *H04L 45/64* (2013.01); *H04L 45/7453* (2013.01); *H04L 61/103* (2013.01); *H04L 67/1023* (2013.01); *H04L 69/22* (2013.01); *H04L 67/1004* (2013.01)

(58) Field of Classification Search
CPC ......... H04L 45/66; H04L 45/42; H04L 45/38; H04L 41/042
See application file for complete search history.

(56) References Cited

U.S. PATENT DOCUMENTS

| | | | |
|---|---|---|---|
| 6,687,758 B2 | 2/2004 | Craft et al. |
| 7,023,797 B2 | 4/2006 | Tagore-Brage |
| 7,478,173 B1 | 1/2009 | Delco |
| 7,502,374 B1 | 3/2009 | Parker et al. |
| 7,710,862 B2 | 5/2010 | McGee et al. |
| 7,783,784 B1 | 8/2010 | Droux et al. |

(Continued)

OTHER PUBLICATIONS

Plummer, An Ethernet Address Resolution Protocol, Nov. 1982, IETF, RFC826, p. 6.*

(Continued)

*Primary Examiner* — John Pezzlo
*Assistant Examiner* — William Johnson
(74) *Attorney, Agent, or Firm* — Zilka-Kotab, PC (57) ABSTRACT

A system includes a server including: logic adapted for receiving traffic from a virtual machine (VM), the traffic including at least one packet, logic adapted for hashing at least a portion of the at least one packet according to a hashing algorithm to obtain a hash value, and logic adapted for selecting an uplink based on the hash value; at least one accelerated network interface card (NIC), each accelerated NIC including: network ports including multiple Peripheral Component Interconnect express (PCIe) ports adapted for communicating with the server and a network, each network port including an uplink, logic adapted for encapsulating the at least one packet into an overlay-encapsulated packet, logic adapted for storing a media access control (MAC) address corresponding to the selected uplink as a source MAC (SMAC) address in an outer header of the overlay-encapsulated packet, and logic adapted for sending the overlay-encapsulated packet via the selected uplink.

21 Claims, 7 Drawing Sheets

(56) References Cited

U.S. PATENT DOCUMENTS

| | | |
|---|---|---|
| 7,962,647 B2 | 6/2011 | Suri et al. |
| 8,031,713 B2 | 10/2011 | Chang et al. |
| 8,612,627 B1 * | 12/2013 | Brandwine .................. 709/240 |
| 8,811,401 B2 * | 8/2014 | Stroud et al. ................. 370/392 |
| 8,978,031 B2 * | 3/2015 | Kamble et al. ................... 718/1 |
| 9,008,085 B2 * | 4/2015 | Kamble et al. ............... 370/389 |
| 2005/0080923 A1 | 4/2005 | Elzur |
| 2010/0115174 A1 * | 5/2010 | Akyol et al. .................. 710/316 |
| 2010/0257349 A1 | 10/2010 | Lee |
| 2013/0336164 A1 * | 12/2013 | Yang et al. .................... 370/255 |
| 2013/0339549 A1 * | 12/2013 | Rangaraman et al. ........ 709/245 |

OTHER PUBLICATIONS

Bradley, Inverse Address Resolution Protocol, Sep. 1998, RFC2390, p. 3,4.*

* cited by examiner

LOAD BALANCING OVERLAY NETWORK TRAFFIC USING A TEAMED SET OF NETWORK INTERFACE CARDS

BACKGROUND

The present invention relates to data center infrastructure, and more particularly, this invention relates to load balancing overlay network traffic using a teamed set of network interface cards.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

Overlay networks may use any available virtualization protocol, such as Virtual eXtensible Local Area Network (VXLAN), locator/ID separation protocol (LISP), overlay transport virtualization (OTV), Network Virtualization using Generic Routing Encapsulation (NVGRE), etc., to connect geographically separated Layer-2 (L2) networks using constructs referred to as tunnels. These tunnels are L2 over Layer-3 (L3) transport tunnels capable of packaging packets into an overlay packet to transport across the networks. L2 packets originated by a virtual machine (VM) in one virtual network and destined to another VM or group of VMs in the same virtual network in another physical location are carried over L3 tunnels.

An overlay network may be implemented using any number of VMs with a virtualization platform controlling the processing of networking packets in and out of each VM. One or more VMs may be associated with the overlay network. The virtualization platform processes the networking traffic associated with each overlay network and/or VM using predefined properties and policies for the corresponding overlay network and/or VM. As the number of overlay networks increases, so does the processing load requirements of the virtualization platform. The processing load requirements of the virtualization platform include a number of tunnels terminated, management of Virtual Tunnel End Points (VTEPs), address learning per tunnel, packet encapsulation and de-capsulation per tunnel, etc. Therefore, for a given performance level of a network, the number of overlay network or VMs is limited by the virtualization platform's processing capabilities. Therefore, there is a need to increase the performance of a virtualization platform without increasing the physical resources available that are used by the virtualization platform in order to continue to expand the use of overlay networks.

Additionally, in order to provide load balancing to servers and specifically to VMs hosted by the servers, server-side Network Interface Cards (NICs) may be teamed to load balance network traffic by statically binding VMs to a particular uplink (referred to as switch-independent teaming, because no configuration is required on the upstream switch) or by configuring either a static or dynamic port channel on both the switch and server and performing load balancing that is dependent on some factor, such as a hash of fields in a packet header. Configuring port channels is referred to as switch-dependant teaming, because it requires configuration to be performed on the upstream switch. Such methods of load balancing fail for overlay traffic because the original packets from one or more VMs are all encapsulated in an overlay header in a tunnel, with an outer header including the Media Access Control (MAC) address and Internet Protocol (IP) address of the virtualization platform kernel. The inner packet is not visible to many components of the network, thereby rendering traditional load balancing ineffective. Accordingly, it would be beneficial to be able to load balance overlay-encapsulated network traffic.

SUMMARY

In one embodiment, a system includes a server including: logic adapted for receiving traffic from a virtual machine (VM), the traffic including at least one packet, logic adapted for hashing at least a portion of the at least one packet according to a hashing algorithm to obtain a hash value, and logic adapted for selecting an uplink based on the hash value; at least one accelerated network interface card (NIC), each accelerated NIC including: a plurality of network ports including multiple Peripheral Component Interconnect express (PCIe) ports adapted for communicating with the server and a network, each network port including an uplink, logic adapted for encapsulating the at least one packet into an overlay-encapsulated packet, logic adapted for storing a media access control (MAC) address corresponding to the selected uplink as a source MAC (SMAC) address in an outer header of the overlay-encapsulated packet, and logic adapted for sending the overlay-encapsulated packet via the selected uplink.

In another embodiment, method for load balancing on a receive side of a server includes receiving a broadcast address resolution protocol (ARP) request packet, determining that a response is merited to the broadcast ARP request packet, hashing at least a portion of the broadcast ARP request packet according to a hashing algorithm to obtain a hash value, selecting an uplink based on the hash value from a plurality of uplinks available to send traffic out to a network, storing a MAC address corresponding to the selected uplink as a SMAC address in a response to the broadcast ARP request packet, and sending the response back to a source of the broadcast ARP request packet with the MAC address corresponding to the selected uplink stored as the SMAC address.

In yet another embodiment, a method for load balancing on a receive side of a server includes receiving a unicast ARP request packet, determining that a response is merited to the unicast ARP request packet, hashing at least a portion of the unicast ARP request packet according to a hashing algorithm to obtain a hash value, selecting an uplink based on the hash value from a plurality of uplinks available to send traffic out to a network, storing a MAC address corresponding to the selected uplink as a SMAC address in a response to the unicast ARP request packet, and sending the response back to a source of the unicast ARP request packet with the MAC address corresponding to the selected uplink stored as the SMAC address.

According to yet another embodiment, a method for load balancing traffic having at least one packet on a plurality of uplinks includes receiving traffic from a VM, hashing at least a portion of the at least one packet according to a hashing algorithm to obtain a hash value, selecting an uplink based on the hash value from a plurality of uplinks available to send traffic out to a network, encapsulating the at least one packet into an overlay-encapsulated packet, storing a MAC address corresponding to the selected uplink as a SMAC address in an outer header of the overlay-encapsulated packet, and sending the overlay-encapsulated packet via the selected uplink.

In another embodiment, a system for load balancing traffic on a plurality of uplinks includes a processor implemented in hardware, the processor being adapted for executing logic, logic adapted for receiving an ARP request packet, logic adapted for hashing at least a portion of the ARP request packet according to a hashing algorithm to obtain a hash value, logic adapted for selecting an uplink based on the hash value from a plurality of uplinks available to send traffic out to a network, logic adapted for storing a MAC address corresponding to the selected uplink as a SMAC address in a response to the ARP request packet, and logic adapted for sending the response back to a source of the ARP request packet with the MAC address corresponding to the selected uplink stored as the SMAC address.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, switch-independent teaming of Network Interface Cards (NICs) used for carrying virtual overlay network traffic is provided. In one approach, an uplink is selected based on a hash of fields in an inner packet header of an overlay-encapsulated packet. Once an uplink is selected, an outer source Media Access Control (MAC) address of the packet is replaced with a MAC address of the selected uplink. This provides for effective load balancing of upstream traffic regardless of the teaming mode (switch dependent or independent). To load balance traffic received on the server, actions taken on receipt or transmission of Address Resolution Protocol (ARP) packets may be manipulated, as described in more detail herein.

In one general embodiment, a system includes a server including: logic adapted for receiving traffic from a virtual machine (VM), the traffic including at least one packet, logic adapted for hashing at least a portion of the at least one packet according to a hashing algorithm to obtain a hash value, and logic adapted for selecting an uplink based on the hash value; at least one accelerated NIC, each accelerated NIC including: a plurality of network ports including multiple Peripheral Component Interconnect express (PCIe) ports adapted for communicating with the server and a network, each network port including an uplink, logic adapted for encapsulating the at least one packet into an overlay-encapsulated packet, logic adapted for storing a MAC address corresponding to the selected uplink as a source MAC (SMAC) address in an outer header of the overlay-encapsulated packet, and logic adapted for sending the overlay-encapsulated packet via the selected uplink.

In another general embodiment, method for load balancing on a receive side of a server includes receiving a broadcast ARP request packet, determining that a response is merited to the broadcast ARP request packet, hashing at least a portion of the broadcast ARP request packet according to a hashing algorithm to obtain a hash value, selecting an uplink based on the hash value from a plurality of uplinks available to send traffic out to a network, storing a MAC address corresponding to the selected uplink as a SMAC address in a response to the broadcast ARP request packet, and sending the response back to a source of the broadcast ARP request packet with the MAC address corresponding to the selected uplink stored as the SMAC address.

In yet another general embodiment, a method for load balancing on a receive side of a server includes receiving a unicast ARP request packet, determining that a response is merited to the unicast ARP request packet, hashing at least a portion of the unicast ARP request packet according to a hashing algorithm to obtain a hash value, selecting an uplink based on the hash value from a plurality of uplinks available to send traffic out to a network, storing a MAC address corresponding to the selected uplink as a SMAC address in a response to the unicast ARP request packet, and sending the response back to a source of the unicast ARP request packet with the MAC address corresponding to the selected uplink stored as the SMAC address.

According to yet another general embodiment, a method for load balancing traffic having at least one packet on a plurality of uplinks includes receiving traffic from a VM, hashing at least a portion of the at least one packet according to a hashing algorithm to obtain a hash value, selecting an uplink based on the hash value from a plurality of uplinks available to send traffic out to a network, encapsulating the at least one packet into an overlay-encapsulated packet, storing a MAC address corresponding to the selected uplink as a SMAC address in an outer header of the overlay-encapsulated packet, and sending the overlay-encapsulated packet via the selected uplink.

In another general embodiment, a system for load balancing traffic on a plurality of uplinks includes a processor implemented in hardware, the processor being adapted for executing logic, logic adapted for receiving an ARP request packet, logic adapted for hashing at least a portion of the ARP request packet according to a hashing algorithm to obtain a hash value, logic adapted for selecting an uplink based on the hash value from a plurality of uplinks available to send traffic out to a network, logic adapted for storing a MAC address corresponding to the selected uplink as a SMAC address in a response to the ARP request packet, and logic adapted for sending the response back to a source of the ARP request packet with the MAC address corresponding to the selected uplink stored as the SMAC address.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
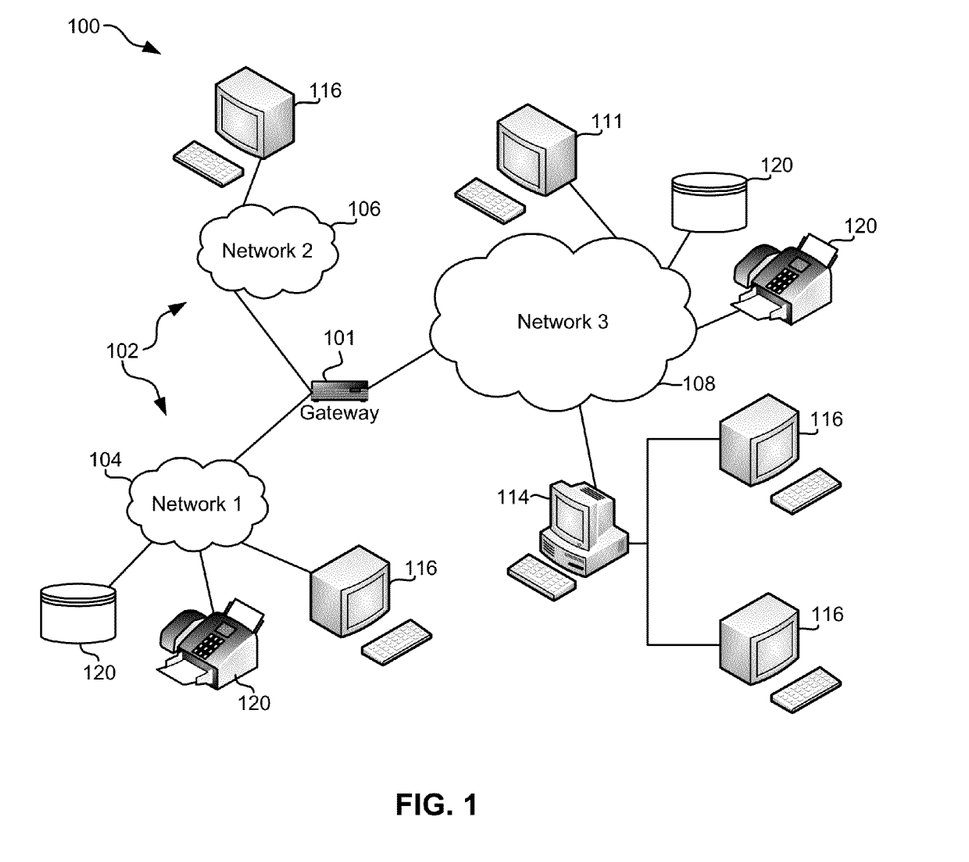
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
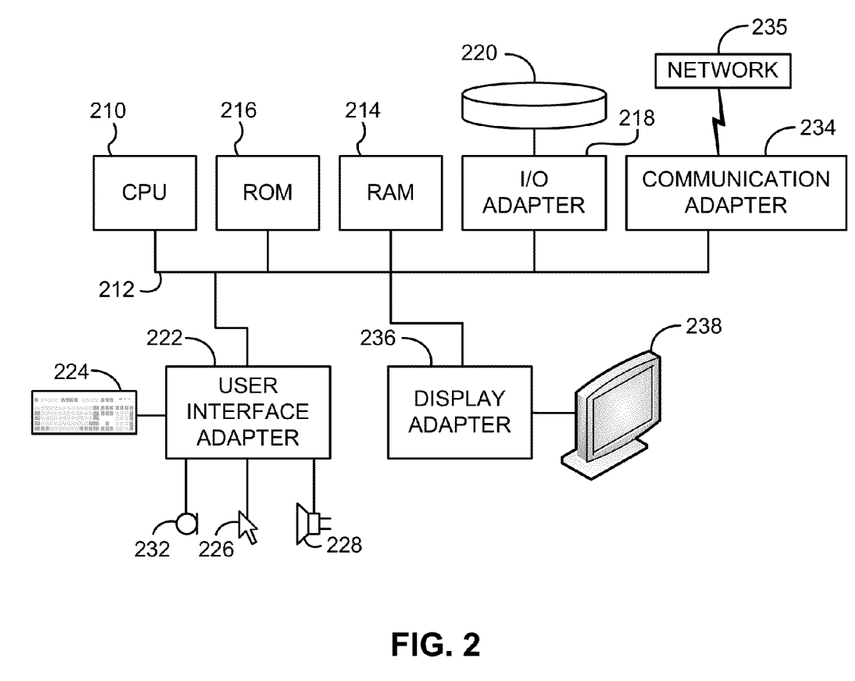
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
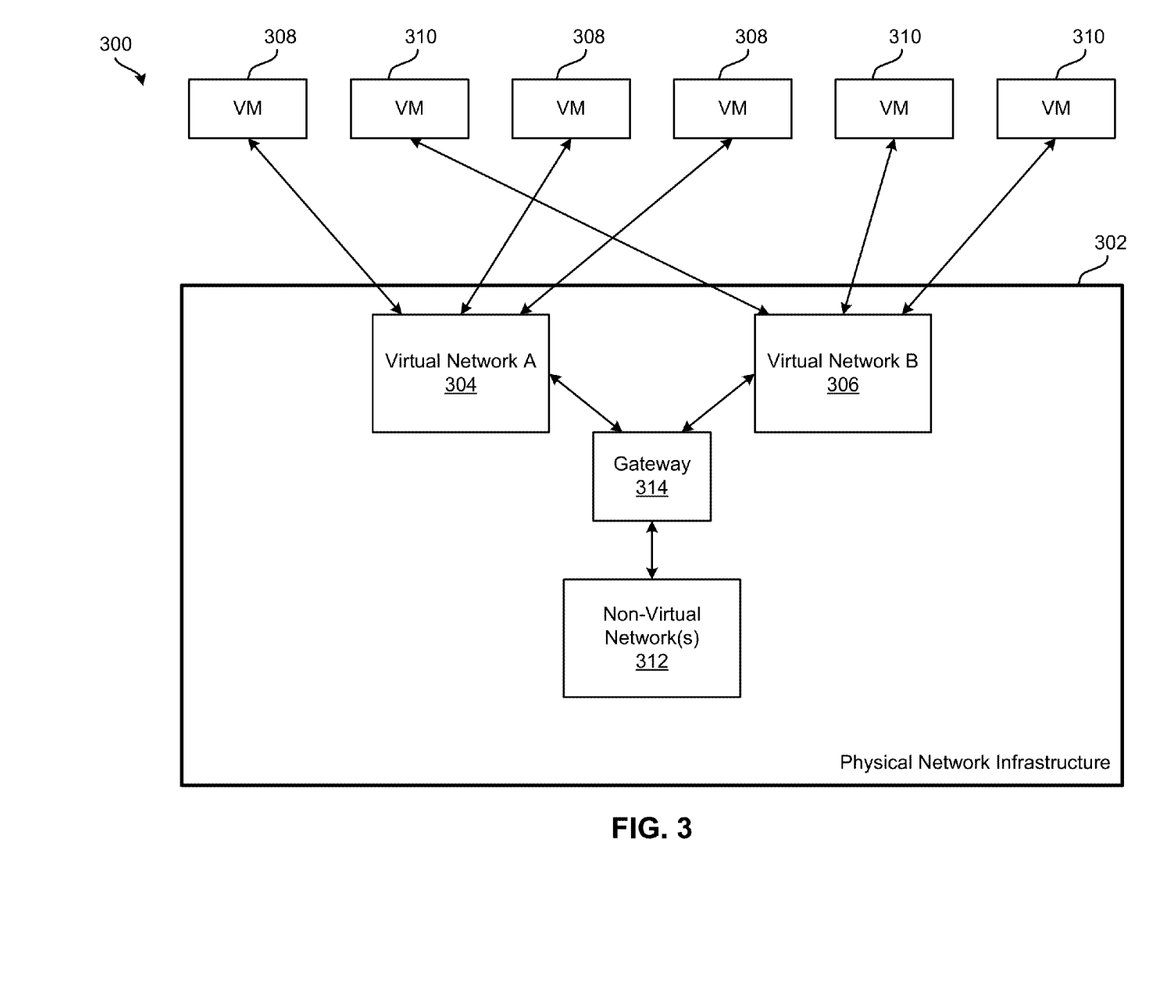
FIG. 3 shows a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

Figure 4:
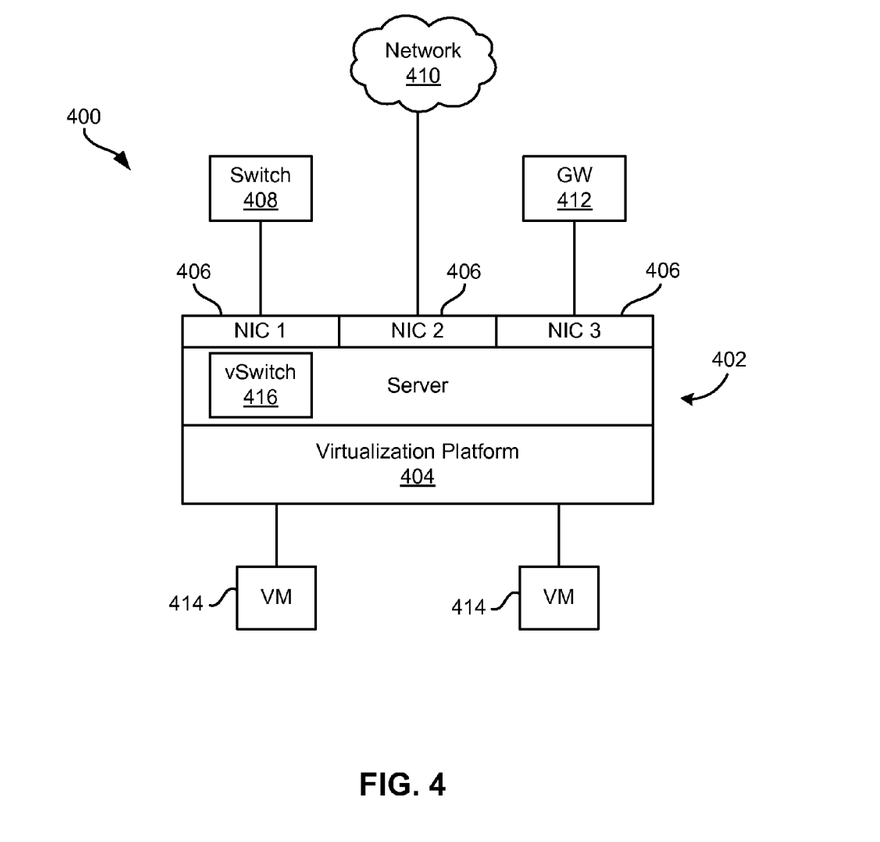
FIG. 4 shows a system, according to one embodiment.

With reference to FIG. 4, a system 400 is shown according to one embodiment. The system 400 includes a server 402 having a virtualization platform 404 and one or more NICs 406 for interfacing with different devices. In this exemplary embodiment, NIC 1 is shown coupled to a switch 408, NIC 2 is shown coupled to a network 410, and NIC 3 is shown coupled to an overlay-capable network gateway (GW) 412. Of course, other devices, networks, or systems may be connected to the server 402 via a NIC 406 that is designed for interfacing with such devices or systems.

The network 410 may include switches, routers, cables, connections, network devices, etc., as would be understood by one of skill in the art. In addition, the virtualization platform 404 may provide and manage a virtual switch (vSwitch) 416 adapted for providing switching functionality to packets sent to and/or received from the VMs 414.

Each NIC 406 is capable of providing an interface between the server 402 and some other device or system, as well as managing communications therebetween. Also, each NIC 406 may include one or more networking ports adapted for communicating with the network 410, the server 402, and any other connected device or devices. Typically, when a packet is encapsulated in an overlay header, the NIC 406 corresponding to the desired destination simply passes the packet through to a destination specified in an outer header of the overlay-encapsulated packet.

Each NIC 406 and/or the virtualization platform 404 may utilize one or more processors. Any type of processor may be used, such as a field programmable gate array (FPGA), a microprocessor, a microcontroller, a central processing unit (CPU), an application specific integrated circuit (ASIC), etc.

The virtualization platform 404 may also provide support for any number of VMs 414, which may be arranged in one or more virtual networks (each virtual network may have a different virtual network identifier (VNID). The number and arrangement of the VMs 414 in FIG. 4 is not meant to be limiting on what configurations are possible, as the Figures only show exemplary arrangements of VMs 414 and networks.

In some embodiments, to provide overlay functionality to the server 402, the virtualization platform 404 may also interact with a plurality of discrete software engines, such as a tunnel manager, an ARP and forwarding information base (FIB) manager, an engine for providing internet protocol multicast (IPMC) support, a packet encapsulation and decapsulation engine, and any other overlay-enhancing software engines as known in the art.

Typically, a NIC 406 does not have visibility to inner packets of any overlay-encapsulated packets, and instead the NIC 406 passes the packets to the virtualization platform 404 for providing overlay functionality. However, in another embodiment, a NIC 406 may be adapted for providing overlay functionality, and is referred to herein as an accelerated NIC.

In another embodiment, in order to bridge between virtualized and non-virtualized networks, a packet to be delivered via a virtual overlay network may be delivered to the overlay-capable network gateway 412 for further forwarding and/or routing outside of the virtual network in which the server 402 is located.

Figure 5:
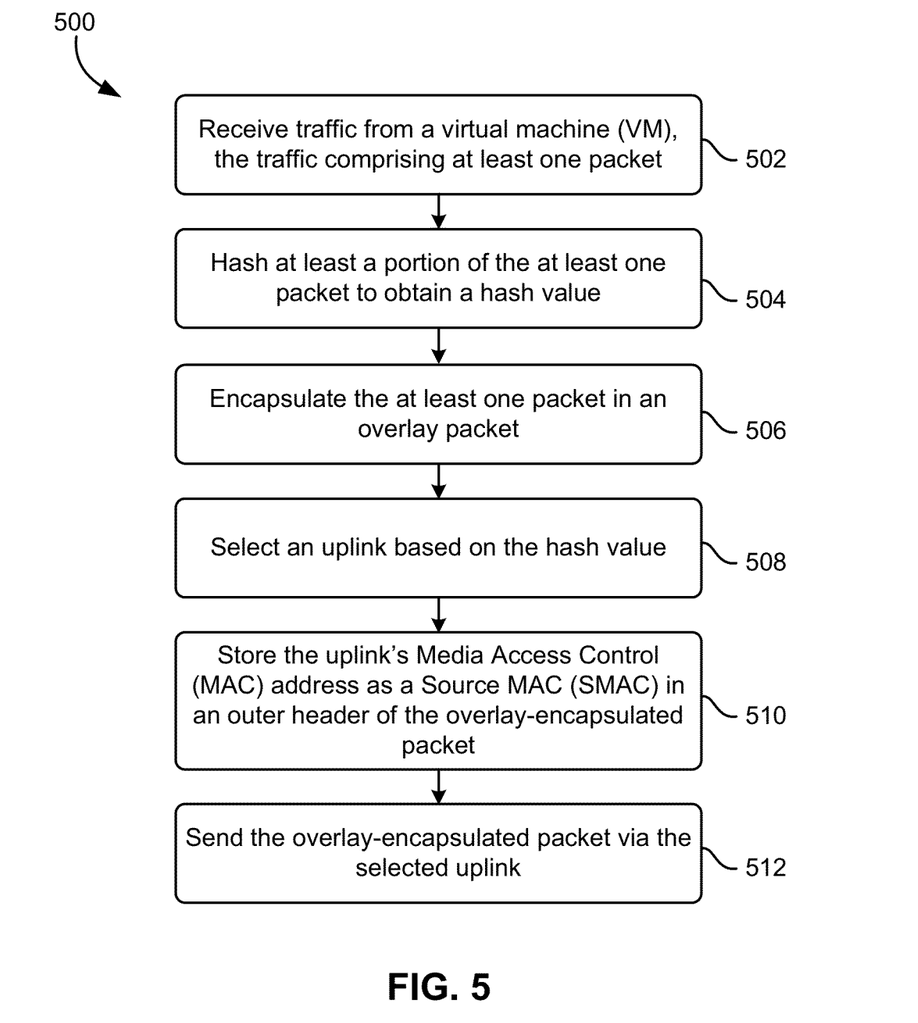
FIG. 5 shows a flowchart of a method for load balancing on a transmit side of a server, according to one embodiment.

Now referring to FIG. 5, a method 500 for load balancing on a transmit side of a server is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by a NIC, an accelerated NIC which is overlay-capable, a processor (such as a CPU, an ASIC, a FPGA, etc.) which may be embedded in and/or operate within a NIC or an accelerated NIC, computer program code embedded in a computer readable storage medium within a NIC or an accelerated NIC, etc.

As shown in FIG. 5, method 500 may initiate with operation 502, where traffic is received from a VM. The traffic comprises at least one packet and may be received, according to one embodiment, by a server or some component thereof, such as a virtualization platform, interface, etc. The packet, typically, will be an IP packet produced by the VM, but in other embodiments, it may be unicast, broadcast, overlay-encapsulated, etc., according to various embodiments.

In operation 504, at least a portion of the at least one packet is hashed according to a hashing algorithm to obtain a hash value. Any suitable hashing algorithm known in the art may be used. In addition, the hashing algorithm may be a perfect hashing algorithm or imperfect, and may be selected such that the possible hash values correspond to the number of uplinks available to send traffic out to the network on, in one approach, e.g., the hashing algorithm may hash perfectly to the number of uplinks. In another approach, the number of possible hash values may correspond to members of a team for which traffic is being load balanced, e.g., if load balancing is being performed on a number n of uplinks, the hashing algorithm may have n possible hash values.

In more approaches, different hashing algorithms may be applied across different groups of uplinks, on different accelerated NICs, on different servers, etc.

According to some embodiments, the packet may be encapsulated within an overlay packet, in which case an inner packet of the overlay-encapsulated packet is hashed.

Any portion or all of the at least one packet may be hashed, such as a header of the packet, a payload of the packet, an outer header, an inner header, etc. If the packet is overlay-encapsulated, the inner header is preferably hashed, but any portion of the packet may be hashed according to various embodiments.

In operation 506, the at least one packet is encapsulated in an overlay-encapsulated packet, as would be understood by one of skill in the art. In one approach, the at least one packet is encapsulated by an accelerated NIC (that is capable of providing overlay functionality), but may be encapsulated by any overlay capable component or device.

In operation 508, an uplink is selected based on the hash value. In this way, because an uplink is selected based on the hash value, traffic may be load balanced across a group of uplinks, all uplinks on a NIC, all uplinks on a server, all uplinks available at any given time, etc.

In operation 510, the selected uplink's MAC address is stored as a SMAC address in an outer header of the overlay-encapsulated packet. In this way, outgoing traffic is load balanced across the uplinks in a desired fashion, in a manner which does not add extraneous processing to any component of the network.

In operation 512, the overlay-encapsulated packet is sent via the selected uplink. This is how load balancing is performed across the available uplinks. When the at least one packet was received, there was a number, set, or group of uplinks available to send the at least one packet out on. In operation 512, the at least one packet is sent out on a selected uplink, which will vary depending on many factors which are determined by the hashing algorithm.

In an exemplary embodiment, a hash of an inner packet header field may be used to select a team member to be used for transmitting the packet. The hash may be based on one or more parameters, including: a virtual port corresponding to the VM (such as the virtual port assigned to the VM), an inner packet header SMAC (inner_smac) address, an inner packet header Destination MAC (inner_dmac) address, an inner Source IP (SIP) address, an inner Destination IP (DIP) address, any combination thereof, etc.

The hashing algorithm calculation may result in choosing one of a plurality of available physical NICs in a particular team or group. The outer SMAC of the packet header (which includes then Virtual MAC (VMAC) initially) may then be overwritten with the MAC address of the chosen NIC. This results in packets being sent out on a particular NIC that will always carry the same outer header SMAC (which is the MAC address of the NIC). Any NIC described in this exemplary embodiment may be an accelerated NIC, if overlay functionality is to be utilized in sending out packets on uplinks of the NIC (one NIC having multiple uplinks) or multiple NICs providing multiple uplinks (one uplink per NIC), or a combination thereof within one or more servers (typically a single server).

According to another embodiment, the method 500 may be executed from a computer program product using a processor capable of executing such computer readable program code.

In another embodiment, the method 500 may be performed by a system, such as a server, a NIC, a NIC having overlay functionality, a gateway, some combination thereof, etc.

Figure 6:
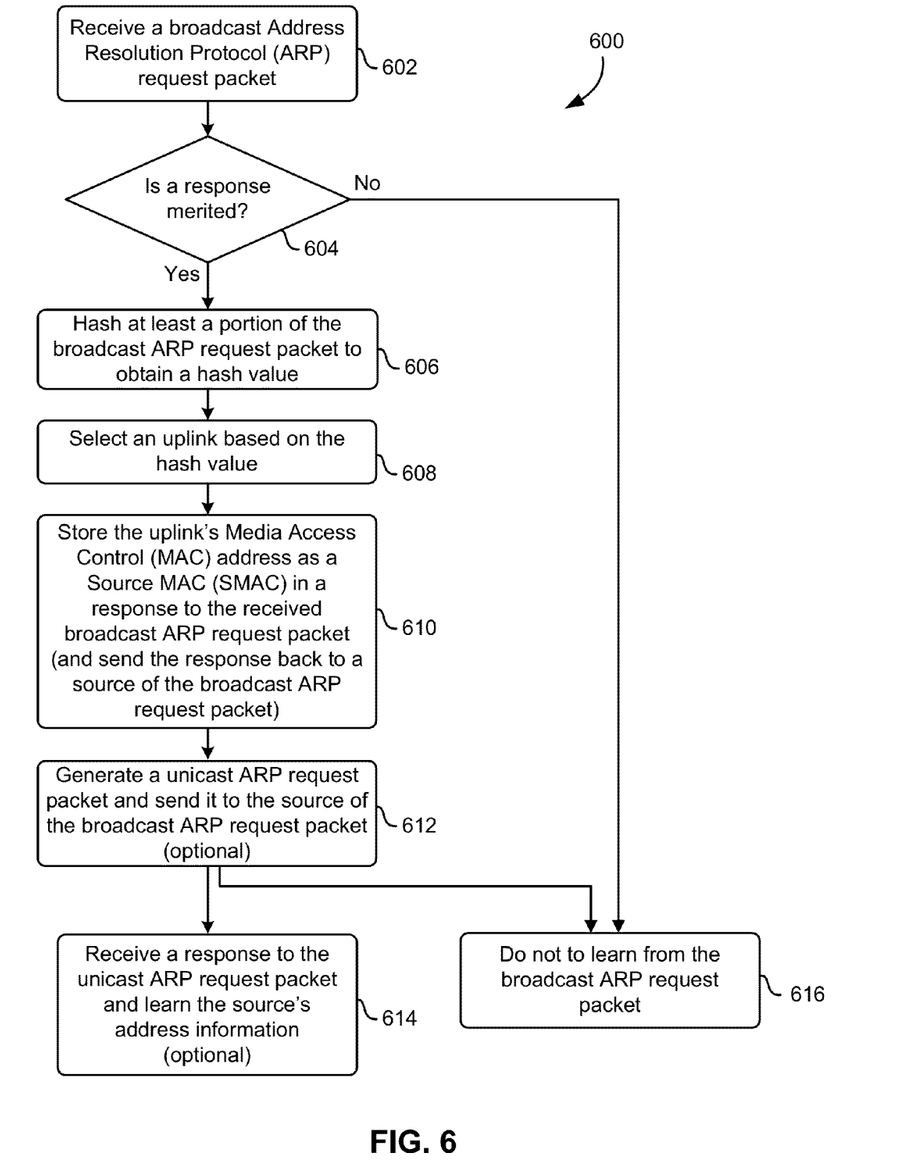
FIG. 6 shows a flowchart of a method for load balancing on a receive side of a server, according to one embodiment.

Now referring to FIG. 6, a method 600 for load balancing on a receive side of a server is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component or components of the operating environment. For example, in various non-limiting embodiments, the method 600 may be partially or entirely performed by an accelerated NIC which is overlay-capable, a NIC, a processor (such as a CPU, an ASIC, a FPGA, etc.) which may be embedded in and/or operate within a NIC or an accelerated NIC, computer program code embedded in a computer readable storage medium within a NIC or an accelerated NIC, etc.

As shown in FIG. 6, method 600 may initiate with operation 602, where a broadcast ARP request packet is received. Put another way, an ARP request packet is received which has been broadcast not only to the receiving device in method 600, but also, possibly, to other devices. The ARP broadcast request packet may be received by a server, and particularly a NIC of a server.

In operation 604, it is determined if a response is merited. This determination is typically made based on whether the address designated in the broadcast ARP request packet is hosted by the server which received the broadcast ARP request packet. If so, a response is merited and the method 600 proceeds to operation 606. If not, then no response is merited, and the method 600 proceeds to operation 616.

In operation 606, at least a portion of the broadcast ARP request packet is hashed according to a hashing algorithm to obtain a hash value. Any portion or all of the packet may be hashed, according to various embodiments.

Any suitable hashing algorithm known in the art may be used. In addition, the hashing algorithm may be a perfect hashing algorithm or imperfect, and may be selected such that a number of possible hash values corresponds to the number of uplinks available to send traffic out on, in one approach, e.g., the hashing algorithm may hash perfectly to produce a number of possible hash values that is the same as the number of uplinks. In another approach, the hash may correspond to members of a team for which traffic is being load balanced, e.g., if load balancing is being performed on a number n of uplinks, the hashing algorithm may be based on the number n.

The hashing algorithm may be based on one or more parameters, such as: a virtual port corresponding to a VM for which the broadcast ARP request packet was originated, an inner packet header SMAC address, an inner packet header DMAC address, an inner SIP address, an inner DIP address, etc.

In more approaches, different hashing algorithms may be applied across different groups of uplinks, on different accelerated NICs, on different servers, etc.

Any portion or all of the at least one packet may be hashed, such as a header of the packet, a payload of the packet, an outer header, an inner header, etc.

In operation 608, an uplink is selected based on the hash value. In this way, because each time an broadcast ARP request packet is received and an uplink is selected based on the hash, traffic that may be received from the source of the broadcast ARP request packet may be load balanced across a group of uplinks, all uplinks on a NIC, all uplinks on a server, all uplinks available at any given time, etc.

In operation 610, the selected uplink's MAC address is stored as a Source MAC (SMAC) address in a response to the received broadcast ARP request packet and the response is sent to a source of the broadcast ARP request packet. In this way, the source device which ultimately receives the response packet is able to store the MAC address of the responding device's chosen uplink in order to send traffic back to the responding device on this selected uplink in the future.

In optional operation 612, a unicast ARP request packet is generated and sent back to the source of the received broadcast ARP request packet. In this way, the server or device which received and responded to the broadcast ARP request packet may learn the address of the originating device, which may be different than the SMAC stored in the broadcast ARP request packet.

In optional operation 614, after the unicast ARP request packet is sent, a response to the unicast ARP request packet may be received. In this case, address information about the source of the broadcast ARP request packet may be learned and stored for subsequent communications with this particular address. In this way, not only is outgoing traffic load balanced across the uplinks in a desired fashion, but incoming traffic may also be load balanced across the available uplinks, in a manner which does not add extraneous processing to any component of the network.

In operation 616, the broadcast ARP request packet is not used to learn about a source of the broadcast ARP request packet, either because the recipient of the broadcast ARP request packet is not the desired recipient, or because it is deemed unnecessary to learn about the source, due to any number of factors, as would be understood by one of skill in the art, e.g., the source is deemed to not be allowed to communicate with the target, the source is intermittent and will change, the target is intermittent, etc.

It is noted that the SMAC from the received broadcast ARP request packet is not learned because this would reset and/or defeat any load balancing which had previously been implemented.

For example, in a situation where a remote host uses one or more unicast ARP response packets to load balance, among its available uplinks, incoming traffic from hosts in a network, when the remote host sends a broadcast ARP request packet to the hosts in the network, then if each host in the network caches the SMAC contained in the broadcast ARP request packet, then this would reset the receiving load balancing that the remote host had previously (and intentionally) implemented earlier using the one or more unicast ARP response packets. To avoid this, each host in the network disregards broadcast ARP request packets as a source for MAC learning.

In some embodiments, outgoing and incoming traffic flows may be load balanced independently, or they may be load balanced similarly depending on some other factor, grouping, and/or condition.

According to another embodiment, the method 600 may be executed from a computer program product using a processor capable of executing such computer readable program code.

In another embodiment, the method 600 may be performed by a system, such as a server, a NIC, a NIC having overlay functionality, a gateway, some combination thereof, etc.

In an exemplary embodiment, switch-dependent teaming is capable of load balancing received traffic without new logic (that needs to be stored in existing devices). In switch-independent teaming, receive side load-balancing may be achieved by load-balancing ARP response packets among any number of available team members (uplinks, NICs, etc.). The selected team member's MAC address is embedded in a unicast ARP response packet.

In various embodiments, criteria may be used for handling ARP messages. In a first embodiment, broadcast ARP request packets may never be forwarded to the operating system (OS) kernel (instead, if the Target IP (TIP) address matches that of the OS kernel, the teaming logic may construct a unicast ARP response), a hash may be performed on the Source IP (SIP) address to choose a team member and the MAC address of the selected NIC may be used in the response. In addition, on receipt of a broadcast ARP request packet, an overlay-capable switch, such as a Distributed Overlay Virtual Ethernet (DOVE) switch, may unicast an ARP request packet to the originating device in order to trigger the originating device to respond with a unicast response which may be used by the OS kernel to learn address information about the originating device.

In another embodiment, unicast ARP response packets may always be forwarded to the OS kernel for learning. This avoids the need for the teaming logic to maintain an ARP cache. This also load balances traffic from different physical hosts onto different members of the team. Note that receive side load balancing is very coarse, there is no ability to load balance traffic from different remote VMs residing on the same physical host—traffic from all VMs on a physical server will ingress on the same team member.

Likewise, when an external gateway or router sends an ARP request packet for a local overlay-capable switch (such as a DOVE switch), the switch may respond with only one of the team members. This means that all traffic coming into the overlay-capable switch from outside the underlying network domain (such as a Layer-2 domain) may use only one of the team members. This shortcoming is common among non-overlay-capable teaming solutions as well.

Figure 7:
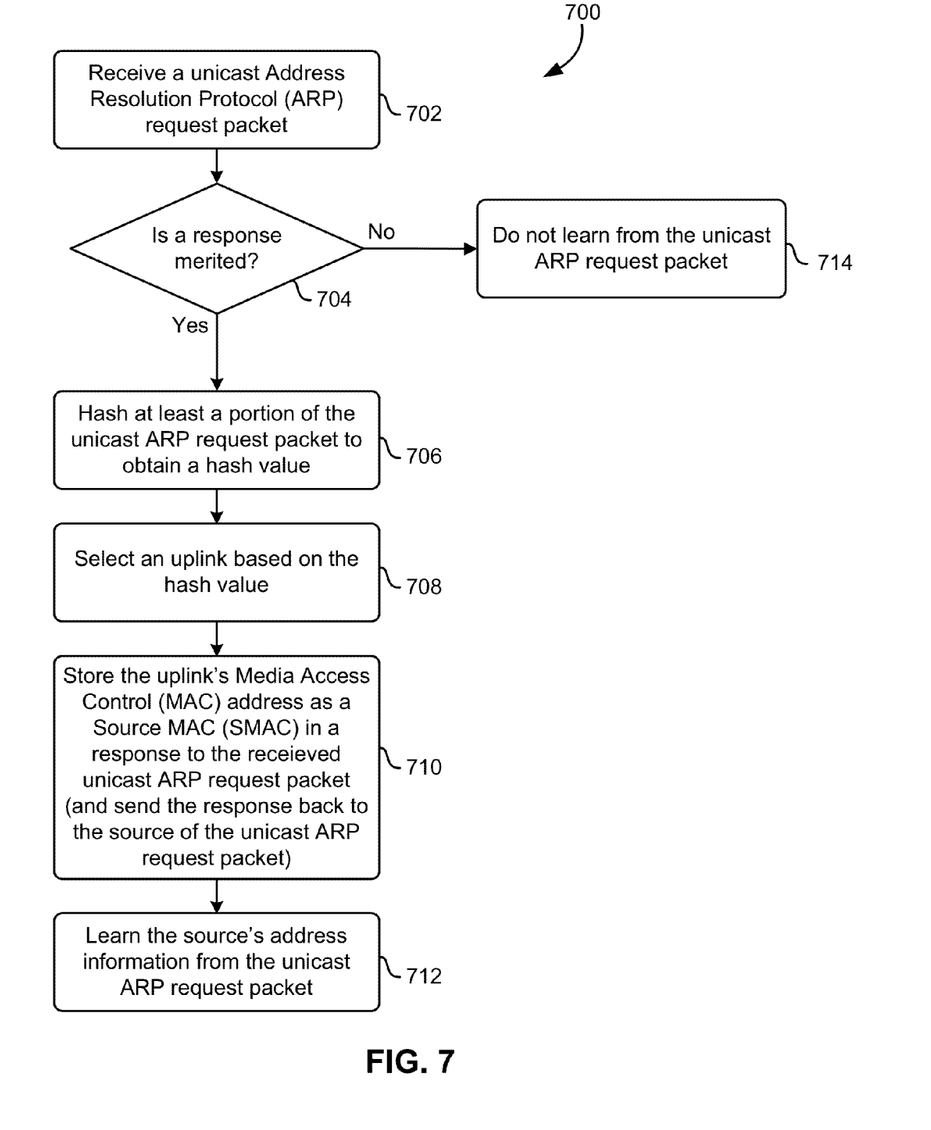
FIG. 7 shows a flowchart of a method for load balancing on a receive side of a server, according to one embodiment.

Now referring to FIG. 7, a method 700 for load balancing on a receive side of a server is shown, according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various non-limiting embodiments, the method 700 may be partially or entirely performed by a NIC, an accelerated NIC which is overlay-capable, a processor (such as a CPU, an ASIC, a FPGA, etc.) which may be embedded in and/or operate within a NIC or an accelerated NIC, computer program code embedded in a computer readable storage medium within a NIC or an accelerated NIC, etc.

As shown in FIG. 7, method 700 may initiate with operation 702, where a unicast ARP request packet is received. The unicast ARP request packet may be received by a server, and particularly a NIC of a server.

In operation 704, it is determined if a response is merited. This determination is typically made based on whether the address designated in the unicast ARP request packet is hosted by the server which received the unicast ARP request packet. If so, a response is merited and the method 700 proceeds to operation 706. If not, then no response is merited, and the method 700 proceeds to operation 714.

In operation 706, at least a portion of the unicast ARP request packet is hashed according to a hashing algorithm to obtain a hash value. Any portion or all of the packet may be hashed, according to various embodiments.

Any suitable hashing algorithm known in the art may be used. In addition, the hashing algorithm may be a perfect hashing algorithm or imperfect, and may be selected to correspond to the number of uplinks available to send traffic out on, in one approach, e.g., the hashing algorithm may hash perfectly to the number of uplinks. In another approach, the hash may correspond to members of a team for which traffic is being load balanced, e.g., if load balancing is being performed on a number n of uplinks, the hashing algorithm may be based on the number n.

The hashing algorithm may be based on one or more parameters, such as: a virtual port corresponding to a VM for which the unicast ARP request packet was originated, an inner packet header SMAC address, an inner packet header DMAC address, an inner SIP address, an inner DIP address, etc.

In more approaches, different hashing algorithms may be applied across different groups of uplinks, on different accelerated NICs, on different servers, etc.

Any portion or all of the at least one packet may be hashed, such as a header of the packet, a payload of the packet, an outer header, an inner header, etc.

In operation 708, an uplink is selected based on the hash value. In this way, because each time a unicast ARP request packet is received and an uplink is selected based on the hash, traffic that may be received from the source of the unicast ARP request packet may be load balanced across a group of uplinks, all uplinks on a NIC, all uplinks on a server, all uplinks available at any given time, etc.

In operation 710, the selected uplink's MAC address is stored as a SMAC address in a response to the received unicast ARP request packet and the response is sent back to the source of the unicast ARP request packet. In this way, any device which ultimately receives the response packet will store the MAC address in order to send traffic back to the originating device. In this way, not only is outgoing traffic load balanced across the uplinks in a desired fashion, but incoming traffic may also be load balanced across the available uplinks, in a manner which does not add extraneous processing to any component of the network.

In operation 712, the source's address information (e.g., IP address, SMAC address, etc.) is learned from the unicast ARP request packet. In this case, address information about the source of the unicast ARP request packet may be learned and stored for subsequent communications with this particular address.

In operation 714, the unicast ARP request packet is not used to learn about a source of the unicast ARP request packet, either because the recipient of the unicast ARP request packet is not the desired recipient, or because it is deemed unnecessary to learn about the source, due to any number of factors, as would be understood by one of skill in the art, e.g., the source is deemed to not be allowed to communicate with the target, the source is intermittent and will change, the target is intermittent, etc.

In some embodiments, outgoing and incoming traffic flows may be load balanced independently, or they may be load balanced similarly depending on some other factor, grouping, and/or condition.

According to another embodiment, the method 700 may be executed from a computer program product using a processor capable of executing such computer readable program code.

In another embodiment, the method 700 may be performed by a system, such as a server, a NIC, a NIC having overlay functionality, a gateway, some combination thereof, etc.

According to an exemplary embodiment, a system for load balancing traffic on a plurality of uplinks comprises a processor implemented in hardware, the processor being adapted for executing logic (such as a CPU, a FPGA, an ASIC, a microcontroller, etc.), logic adapted for receiving an ARP request packet (either broadcast or unicast), logic adapted for hashing at least a portion of the ARP request packet according to a hashing algorithm to obtain a hash value, logic adapted for selecting an uplink based on the hash value from a plurality of uplinks available to send traffic out to a network, logic adapted for storing a MAC address corresponding to the selected uplink as a SMAC address in a response to the ARP request packet, and logic adapted for sending the response back to a source of the ARP request packet with the MAC address corresponding to the selected uplink stored as the SMAC address.

In a further embodiment, wherein when the ARP request packet is unicast, address information about the source of the ARP request packet is learned from the ARP request packet and stored for subsequent communication with the source. Also, when the ARP request packet is broadcast, the system may further comprise logic adapted for generating a unicast ARP request packet and sending the unicast ARP request packet to the source of the broadcast ARP request packet, logic adapted for receiving a response from the source of the broadcast ARP request packet, the response comprising address information about the source of the broadcast ARP request packet, and logic adapted for learning and storing the address information about the source of the broadcast ARP request packet. Furthermore, when the response from the source of the broadcast ARP request packet is not received, address information is not learned from the broadcast ARP request packet.

In more approaches, any methods described herein may be implemented in a system or computer program product. A system may include a computer readable storage medium and logic adapted for performing the desired method, the logic being stored to the computer readable storage medium. A computer program product may include a computer readable storage medium on which computer readable program code is stored, the computer readable program code being designed to execute the desired method.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a server, comprising:
logic configured to receive traffic from a virtual machine (VM), the traffic comprising at least one packet;
logic configured to hash at least a portion of the at least one packet according to a hashing algorithm to obtain a hash value; and
logic configured to select an uplink based on the hash value;
at least one accelerated network interface card (NIC), each accelerated NIC comprising:
a plurality of network ports including multiple Peripheral Component Interconnect express (PCIe) ports adapted for communicating with the server and a network, each network port comprising an uplink;
logic configured to encapsulate the at least one packet into an overlay-encapsulated packet using the accelerated NIC;
logic configured to store a media access control (MAC) address corresponding to the selected uplink as a source MAC (SMAC) address in an outer header of the overlay-encapsulated packet using the accelerated NIC; and
logic configured to send the overlay-encapsulated packet via the selected uplink using the accelerated NIC.

2. The system as recited in claim 1, wherein the hashing algorithm is a perfect hashing algorithm selected to hash perfectly to a number of uplinks available to send traffic out to the network.

3. The system as recited in claim 1, wherein a header of the at least one packet is hashed.

4. The system as recited in claim 1, wherein a header of an inner packet of the at least one packet is hashed when the at least one packet is overlay-encapsulated.

5. The system as recited in claim 1, wherein the hashing algorithm is based on one or more parameters, the one or more parameters comprising:
a virtual port corresponding to the VM;
an inner packet header SMAC address;
an inner packet header destination MAC (DMAC) address;
an inner source internet protocol (SIP) address; and
an inner destination internet protocol (DIP) address.

6. A method for load balancing on a receive side of a server, the method comprising:
receiving a broadcast address resolution protocol (ARP) request packet using a network interface card (NIC) of a server;
determining that a response is merited to the broadcast ARP request packet based on whether an address designated in the broadcast ARP request packet is hosted by the server;
hashing at least a portion of the broadcast ARP request packet according to a hashing algorithm to obtain a hash value using the NIC when a response is merited;
selecting an uplink based on the hash value from a plurality of uplinks available to send traffic out to a network, wherein each hash value corresponds to one of the plurality of uplinks;
storing a media access control (MAC) address corresponding to the selected uplink as a source MAC (SMAC) address in a response to the broadcast ARP request packet; and
sending the response back to a source of the broadcast ARP request packet with the MAC address corresponding to the selected uplink stored as the SMAC address, wherein a SMAC from the broadcast ARP request packet is not learned and not stored by the NIC, wherein a header of an inner packet of the broadcast ARP request packet is hashed when the broadcast ARP request packet is overlay-encapsulated, and wherein the NIC is an accelerated NIC configured to provide overlay functionality.

7. The method as recited in claim 6, wherein the hashing algorithm is a perfect hashing algorithm selected to hash perfectly to a number of uplinks available to send traffic out to the network.

8. The method as recited in claim 6, wherein a header of the broadcast ARP request packet is hashed when the broadcast ARP request packet is not overlay-encapsulated.

9. The method as recited in claim 6, wherein the hashing algorithm is based on one or more parameters, the one or more parameters comprising:
- a virtual port corresponding to a virtual machine (VM) for which the broadcast ARP request packet was originated;
- an inner packet header SMAC address;
- an inner packet header destination MAC (DMAC) address;
- an inner source internet protocol (SIP) address; and
- an inner destination internet protocol (DIP) address.

10. The method as recited in claim 6, further comprising:
- generating a unicast ARP request packet and sending the unicast ARP request packet to a source of the broadcast ARP request packet via the selected uplink when a response is merited;
- receiving a response from the source of the broadcast ARP request packet, the response comprising address information about the source of the broadcast ARP request packet; and
- storing the address information about the source of the broadcast ARP request packet,
- wherein when the response from the source of the broadcast ARP request packet is not received, address information is not learned from the broadcast ARP request packet and not stored.

11. A method for load balancing on a receive side of a server, the method comprising:
- receiving a unicast address resolution protocol (ARP) request packet using a network interface card (NIC) of a server;
- determining that a response is merited to the unicast ARP request packet using the NIC;
- hashing at least a portion of the unicast ARP request packet according to a hashing algorithm to obtain a hash value;
- selecting an uplink based on the hash value from a plurality of uplinks available to send traffic out to a network using the NIC;
- storing a media access control (MAC) address corresponding to the selected uplink as a source MAC (SMAC) address in a response to the unicast ARP request packet using the NIC; and
- sending the response back to a source of the unicast ARP request packet with the MAC address corresponding to the selected uplink stored as the SMAC address using the NIC,
- wherein a header of an inner packet of the unicast ARP request packet is hashed when the unicast ARP request packet is overlay-encapsulated.

12. The method as recited in claim 11, wherein the hashing algorithm is a perfect hashing algorithm selected to hash perfectly to a number of uplinks available to send traffic out to the network.

13. The method as recited in claim 11, wherein a header of the unicast ARP request packet is hashed when the unicast ARP request packet is not overlay-encapsulated.

14. The method as recited in claim 11, wherein the hashing algorithm is based on one or more parameters, the one or more parameters comprising:
- a virtual port corresponding to a virtual machine (VM) for which the unicast ARP request packet was originated;
- an inner packet header SMAC address;
- an inner packet header destination MAC (DMAC) address;
- an inner source internet protocol (SIP) address; and
- an inner destination internet protocol (DIP) address.

15. The method as recited in claim 11, wherein when it is determined that a response to the unicast ARP request packet is not merited, address information is not learned from the unicast ARP request packet and not stored.

16. A method for load balancing traffic on a plurality of uplinks, the method comprising:
- receiving traffic from a virtual machine (VM), the traffic comprising at least one packet;
- hashing at least a portion of the at least one packet according to a hashing algorithm to obtain a hash value using an accelerated network interface card (NIC) of a server, the accelerated NIC being configured to provide overlay functionality;
- selecting an uplink based on the hash value from a plurality of uplinks available to send traffic out to a network using the accelerated NIC;
- encapsulating the at least one packet into an overlay-encapsulated packet;
- storing a media access control (MAC) address corresponding to the selected uplink as a source MAC (SMAC) address in an outer header of the overlay-encapsulated packet; and
- sending the overlay-encapsulated packet via the selected uplink.

17. The method as recited in claim 16, wherein the hashing algorithm is selected to correspond to a number of uplinks available to send traffic out to the network, and wherein a header of the at least one packet is hashed.

18. The method as recited in claim 16, wherein the hashing algorithm is based on one or more parameters, the one or more parameters comprising:
- a virtual port corresponding to the VM;
- an inner packet header SMAC address;
- an inner packet header destination MAC (DMAC) address;
- an inner source internet protocol (SIP) address; and
- an inner destination internet protocol (DIP) address.

19. A system for load balancing traffic on a plurality of uplinks, the system comprising:
- a processor implemented in hardware, the processor being adapted for executing logic;
- logic configured to receive an address resolution protocol (ARP) request packet using a network interface card (NIC) of a server;
- logic configured to hash at least a portion of the ARP request packet according to a hashing algorithm to obtain a hash value using the NIC;
- logic configured to select an uplink based on the hash value from a plurality of uplinks available to send traffic out to a network using the NIC;
- logic configured to store a media access control (MAC) address corresponding to the selected uplink as a source MAC (SMAC) address in a response to the ARP request packet; and logic configured to send the response back to a source of the ARP request packet with the MAC address corresponding to the selected uplink stored as the SMAC address, wherein a header of the ARP request packet is hashed to obtain the hash value when the ARP request packet is not overlay-encapsulated, and wherein a header of an inner packet of the ARP request packet is hashed to obtain the hash value when the ARP request packet is overlay-encapsulated.

20. The system as recited in claim 19, wherein when the ARP request packet is unicast, address information about the source of the unicast ARP request packet is learned from the unicast ARP request packet and stored for subsequent communication with the source, and wherein when the ARP request packet is broadcast, the system further comprises:

logic configured to generate a unicast ARP request packet and sending the unicast ARP request packet to the source of the broadcast ARP request packet;

logic configured to receive a response from the source of the broadcast ARP request packet, the response comprising address information about the source of the broadcast ARP request packet; and     logic configured to learn and store the address information about the source of the broadcast ARP request packet, wherein when the response from the from the source of the broadcast ARP request packet is not received, address information is not learned from the broadcast ARP request packet and not stored.

21. The method as recited in claim 11, wherein the hashing algorithm is a perfect hashing algorithm selected to hash perfectly to a number of uplinks available to send traffic out to the network, wherein when it is determined that a response to the unicast ARP request packet is not merited, address information is not learned from the unicast ARP request packet and not stored, and wherein the hashing algorithm is based on a virtual port corresponding to a virtual machine (VM) for which the unicast ARP request packet was originated and one or more parameters, the one or more parameters comprising:

an inner packet header SMAC address;

an inner packet header destination MAC (DMAC) address;

an inner source internet protocol (SIP) address; and an inner destination internet protocol (DIP) address.

\* \* \* \* \*